United States Patent
Yang et al.

(10) Patent No.: US 9,560,679 B2
(45) Date of Patent: Jan. 31, 2017

(54) METHOD, APPARATUS, SYSTEM, COMPUTER PROGRAM AND COMPUTER PROGRAM PRODUCTS FOR PROVIDING A PLMN IDENTIFIER TO A NODE OF A RAN

(71) Applicant: TELEFONAKTIEBOLAGET L M ERICSSON (PUBL), Stockholm (SE)

(72) Inventors: Yong Yang, Kållered (SE); Angelo Centonza, Hampshire (GB); Hans Mattsson, Bollebygd (SE); Paul Schliwa-Bertling, Liungsbro (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 230 days.

(21) Appl. No.: 14/284,052

(22) Filed: May 21, 2014

(65) Prior Publication Data

US 2014/0348129 A1 Nov. 27, 2014

Related U.S. Application Data

(60) Provisional application No. 61/827,343, filed on May 24, 2013.

(51) Int. Cl.
| | |
|---|---|
| H04W 76/02 | (2009.01) |
| H04W 36/00 | (2009.01) |
| H04W 8/08 | (2009.01) |
| H04W 88/08 | (2009.01) |
| H04W 88/16 | (2009.01) |
| H04W 88/14 | (2009.01) |

(52) U.S. Cl.
CPC ............ *H04W 76/021* (2013.01); *H04W 8/08* (2013.01); *H04W 36/0016* (2013.01); *H04W 88/08* (2013.01); *H04W 88/14* (2013.01); *H04W 88/16* (2013.01)

(58) Field of Classification Search
CPC ............ H04W 76/022; H04W 76/021; H04W 36/0016
See application file for complete search history.

(56) References Cited

U.S. PATENT DOCUMENTS

| | | | |
|---|---|---|---|
| 8,566,455 B1 * | 10/2013 | Zhao .................... | H04W 76/025 709/227 |
| 2010/0246500 A1 * | 9/2010 | Rydnell ................ | H04W 8/082 370/329 |

(Continued)

OTHER PUBLICATIONS

Vodafone, "Proposed CR on TS 23.060 for SIRIG," 3GPP TSG CT WG4 Meeting #56bis, C4-120785, Taipei, Taiwan, Apr. 16-20, 2012, 11 pages.

(Continued)

*Primary Examiner* — Omer S Mian
(74) *Attorney, Agent, or Firm* — Rothwell, Figg, Ernst, & Manbeck, P.C.

(57) ABSTRACT

A method in a communication system includes a first core network node (CN), a second CN, a base station apparatus serving a user equipment (UE), and a packet data network gateway (PGW) associated with the UE, the method being performed by the first CN. The method includes the first CN receiving a tunneling endpoint identifier (TEID) information element from a second CN, the TEID information element comprises a plurality of fields. The one of the plurality of fields includes a Public Land Mobile Network (PLMN).

15 Claims, 11 Drawing Sheets

(56) References Cited

U.S. PATENT DOCUMENTS

2015/0140963 A1* 5/2015 Wu .................. H04L 12/1482
455/407
2015/0296424 A1* 10/2015 Xu ................... H04W 36/0033
370/331

OTHER PUBLICATIONS

Hitachi, "PGW-PLMN Id for Mobility Scenarios," 3GPP TSG CT WG4 Meeting #59, C4-122401, New Orleans, US, Nov. 12-16, 2012, 12 pages.
Vodafone, "Gb Interface Signalling for SIRIG," 3GPP TSG-GERAN Meeting #55, GP-12119, Vienna, Austria, Aug. 27-31, 2012, 12 pages.
Huawei Technologies Co. et al., "Discussion on SIRIG Solution," 3GPP TSG GERAN #55, GP-120956, Vienna, Austria, Aug. 27-31, 2012, 5 pages.
International Search Report and Written Opinion, mailed Oct. 7, 2014, International Application No. PCT/EP2014/060477, Filing Date: May 21, 2014, 13 pages.

\* cited by examiner

METHOD, APPARATUS, SYSTEM, COMPUTER PROGRAM AND COMPUTER PROGRAM PRODUCTS FOR PROVIDING A PLMN IDENTIFIER TO A NODE OF A RAN

CROSS REFERENCE TO RELATED APPLICATION(S)

This application claims the benefit of U.S. Provisional Application No. 61/827,343, filed May 24, 2013, which in turn claims priority to International Application No. PCT/EP2014/060477, filed on 21 May 2014, both of which are incorporated herein by reference.

TECHNICAL FIELD

This disclosure relates to providing a PLMN identifier to a node of a radio access network (RAN).

BACKGROUND

A RAN can improve its management of radio resources by knowing services currently being used by wireless communication devices (referred to herein as "user equipment (UE)") that are served by the RAN. In 3GPP, such a function is called SIRIG (which stands for Service identification for improved radio utilization for GERAN), where the service identification is provided to the RAN (e.g., provided to a base station of the RAN or a radio network controlling in the RAN) by a core network node (CN) comprising a Mobility Management Entity (MME) or a serving GPRS support node (SGSN).

While SIRIG is currently only defined for GERANs (GSM EDGE Radio Access Networks), SIRIG can be extended to other radio access technologies (RATs), e.g., universal mobile telecommunications system (UMTS), long term evolution (LTE), etc.

SUMMARY

According to an aspect of the present invention, a method in a communication system includes a first core network node (CN), a second CN, a base station apparatus serving a user equipment (UE), and a packet data network gateway (PGW) associated with the UE, the method being performed by the first CN. The method includes the first CN receiving a tunneling endpoint identifier (TEID) information element form a second CN, the TEID information element comprises a plurality of fields. The one of the plurality of fields includes a Public Land Mobile Network (PLMN) identifier of the PGW. The method further includes the first CN forwarding the received PLMN identifier to the base station apparatus.

According to another aspect of the present invention, a method in a communication system includes an SGSN, a base station serving a user equipment (UE), an RNC controlling the base station, and a packet data network gateway (PGW) associated with the UE, the method being performed by the SGSN. The method includes the SGSN obtaining a PLMN identifier (ID) of the PGW. The method further includes the SGSN transmitting the PLMN ID to the RNC.

According to another aspect of the present invention, a method in a communication system includes a first core network node (CN), a base station apparatus serving a user equipment (UE), and a packet data network gateway (PGW) associated with the UE, the method being performed by the first CN. The method includes the first CN obtaining a PLMN identifier of the PGW. The method further includes the first CN transmitting a message to the base station apparatus. The message includes: (i) an information element containing the PLMN ID of the PGW; and (ii) a radio access bearer (RAB) identifier information element including data identifying a RAB.

According to another aspect of the present invention, a method in a communication system includes a first core network node (CN), a second CN, and a packet data network gateway (PGW) associated with user equipment (UE). The method is performed by the first CN and includes the first CN encoding a Public Land Mobile Network identifier (PLMN ID) of the PGW in a TEID/GRE Key field of a F-TEID information element. The method further includes the first CN transmitting the F-TEID information element containing the PLMN ID to the second CN.

The SIRIG function supports both roaming and network sharing scenarios. (See SP-120252 and SP-120483). The solution to support the roaming scenario is specified in section 5.3.5.3 in 3GPP TS 23.060 as follows:

"When the serving A/Gb mode SGSN receives SCI in a GTP-U packet, it copies it, without modifying its value, into a Gb interface information element that is sent by the SGSN in the downlink Gb interface user data packet to the GERAN access. In order to allow the GERAN to map the SCI into RRM behaviour, the downlink Gb interface user data packet also carries the HPLMN ID (in the IMSI parameter) and additional information, added by the SGSN, which indicates whether the SCI is assigned by a GGSN/P-GW in e.g. the Home PLMN or Visited PLMN. Absence of additional information is an indication of a VPLMN provided SCI The A/Gb mode GERAN uses the information from the SGSN to determine whether to map, and how to map, the SCI to the related RRM behaviour. If the GERAN is not configured with an SCI mapping for the SGSN provided information, then the GERAN shall treat the user plane packet normally, i.e. the GERAN ignores the SCI.

NOTE 4: When sending downlink GTP-U packets, there are some transient periods where the "current RAT" information for the user may be incorrect at the GGSN/P-GW e.g. after a handover from (E)UTRAN to GERAN, or if the MS is in idle mode with ISR active, or if the MS is in idle mode and located in a Routing Area comprising GERAN and UTRAN cells. In these cases, the A/Gb mode GERAN may receive the first downlink user plane packets without Service Class Indicator."

Thus, the BS based on the knowledge of the international mobile subscriber identity (IMSI) and the additional information indicating whether the subscriber controlled input (SCI) is assigned by a GGSN/P-GW (e.g., the Home PLMN or Visited PLMN) interprets the semantics of SCI and apply relevant radio resource management (RRM) behaviors. But, the above solution may have a problem when SIRIG function is extended to LTE and UMTS because the enodeB (eNB) has no knowledge of IMSI. Therefore the solution doesn't work for LTE.

When Direct Tunnel is used in 3G or 4G is used, the payload path may be RNC/eNB-SGW-PGW, which indicates that the SGW has to insert such "additional information indicating whether the SCI is assigned by a GGSN/P-GW in e.g. the Home PLMN or Visited PLMN." When Direct Tunnel is not used, the payload path would be RNC-SGSN-SGW-PGW, which indicates that the SGSN has to insert such "additional information indicating whether the SCI is assigned by a GGSN/P-GW in e.g. the Home PLMN or Visited PLMN.".

Because both RNC and eNB support the Bearer Service concept (where the UMTS bearer service is specified in 3GPP TS 23.107 and EPS bearer is specified in the section 4.7 in TS 23.401), the SGW or MME/SGSN can inform RNC or eNB about PLMN of the PGW (i.e., the PLMN in which the PGW is located) for each bearer contexts within a given PDN connection. The SGW or MME/SGSN can inform RNC/eNB about the PLMN of the PGW during, for example, RAB assignment procedure and SRNS relocation procedure in 3G (or during initial UE context setup/E-RAB establishment and handover procedure in LTE). Both RNC and eNB have no PDN connection level concept but only bearer context within a PDN connection.

DETAILED DESCRIPTION

Figure 1:
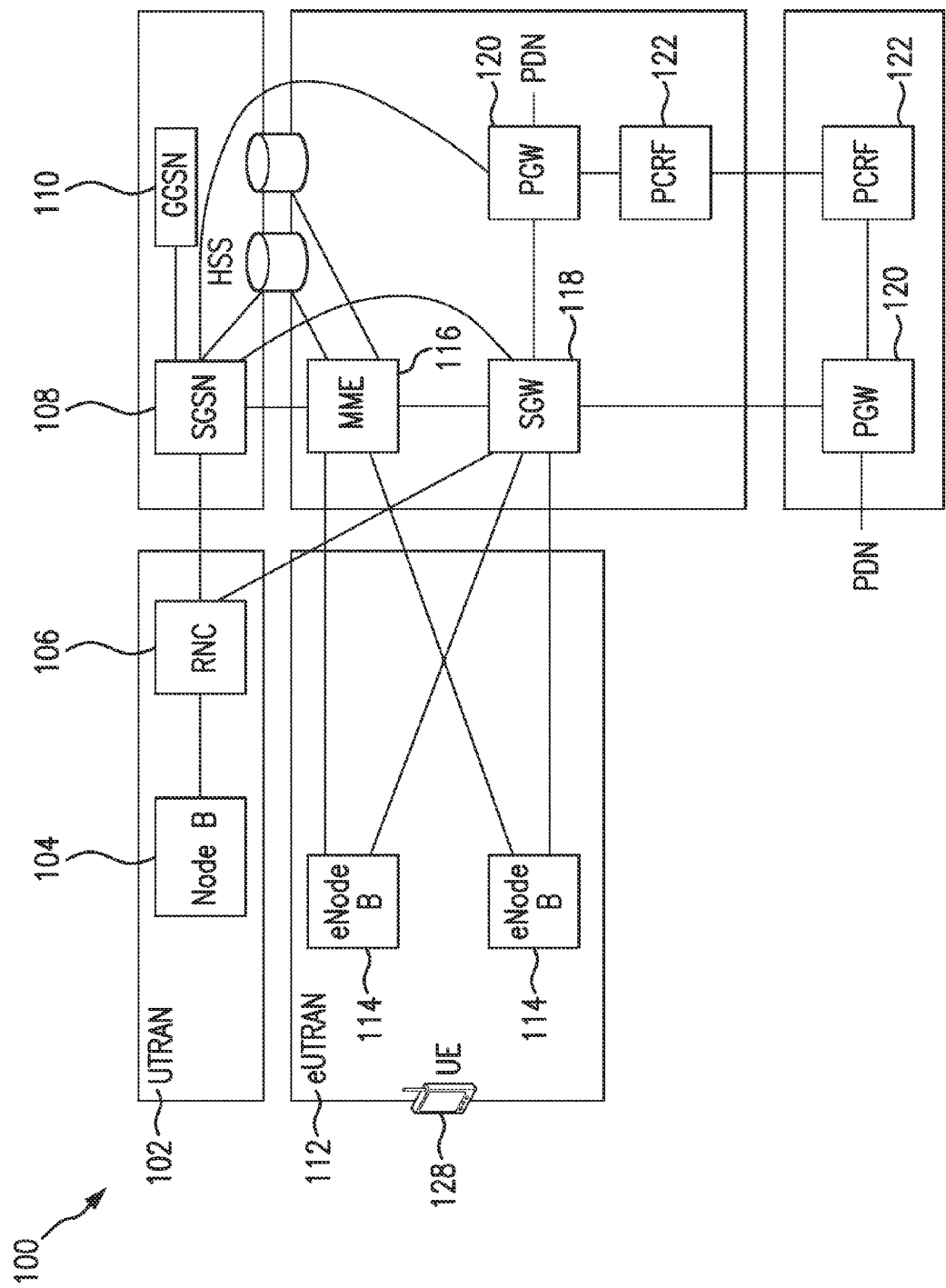
FIG. 1 illustrates an example communication system 100 in which embodiments of this disclosure are implemented.

This disclosure relates to providing a PLMN identifier to a node of a radio access network (RAN). In embodiments, the present invention enables roaming support for SIRIG when it is used for UMTS and LTE. Thus, comparing with the existing solution, one or more embodiment are much more efficient as the PLMN information of the PGW is provided per bearer context, not per GTP-U packet, which reduces very much processing load in eNB 114, RNC 106, SGSN 108, SGW 118, as shown in FIG. 1. The disclosure also allows for transfer of information during handover procedures, useful for SIRIG solutions in UTRAN and E-UTRAN.

I. Embed PLMN Identifier in the User Plane Address

Before user plane data can be transferred to the UE 128 (see FIG. 1), a user plane path, i.e., a bearer has to be established. The bearer establishment may happen during one or more of the following procedures: Initial attach (in E-UTRAN 112 in FIG. 1), TAU with Active flag, PDP Context Activation, RAU with Follow-on-request flag, SRNS relocation (RAB need to be established in the target RAN before UE is moving in), etc.

The SGW 118 (3G when DT is used or 4G for EPS), the SGSN 108 (when DT is not used in 3G), or the GGSN 110 (3G when DT is used but it is connected with Gn/Gp SGSN), will provide user plane transportation address (IP address+ TEID=F-TEID) to the RAN via the MME 116/SGSN 108 (through S1-MME and Iu interface).

For 3G and when direct tunnel is used (or for 4G), the SGW will provide SGW F-TEID(s) for the user plane for each bearer context. The F-TEID(s) will be forwarded by the SGSN 108 or the MME 116 during RAB assignment procedure or during initial UE context setup/E-RAB establishment procedure to the RNC 106 or the eNB 114. Those SGW F-TEID(s) are used by RNC 106 and eNB 114 to send any uplink user plane data. During SRNS relocation procedure in 3G or handover procedure in LTE, the target SGSN 108 or MME 116 provides the SGW 118 user plane F-TEID either received from the source MME 116/SGSN 108 (in case the SGW is not relocated) or from a new SGW (in case the SGW is relocated).

Figure 2:
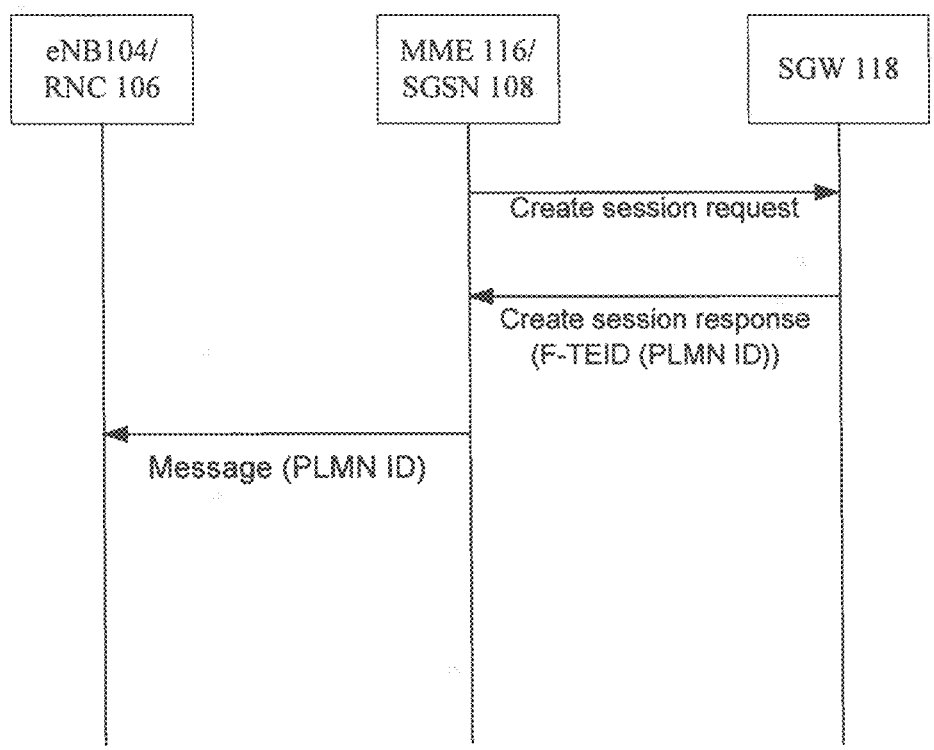
FIGS. 2-8, 9A and 9B illustrates example flows in which embodiments of this disclosure are implemented.

This disclosure proposes that the SGW 118 embed a PLMN identifier (PLMN ID) into the SGW F-TEID when it is sent to the MME 116/SGSN 108, where the embedded PLMN ID identifies the PLMN of the PGW 120 (i.e., the PLMN in which the PGW is located) associated with the UE 128. This is illustrated in FIG. 2, which shows the SGW 118 receiving a create session request message from an MME 116 (or SGSN 108) and then transmitting a create session response message to the MME 116/SGSN 108, which creates a session response message that includes an F-TEID information element that contains a field containing the PLMN ID.

Figure 8:
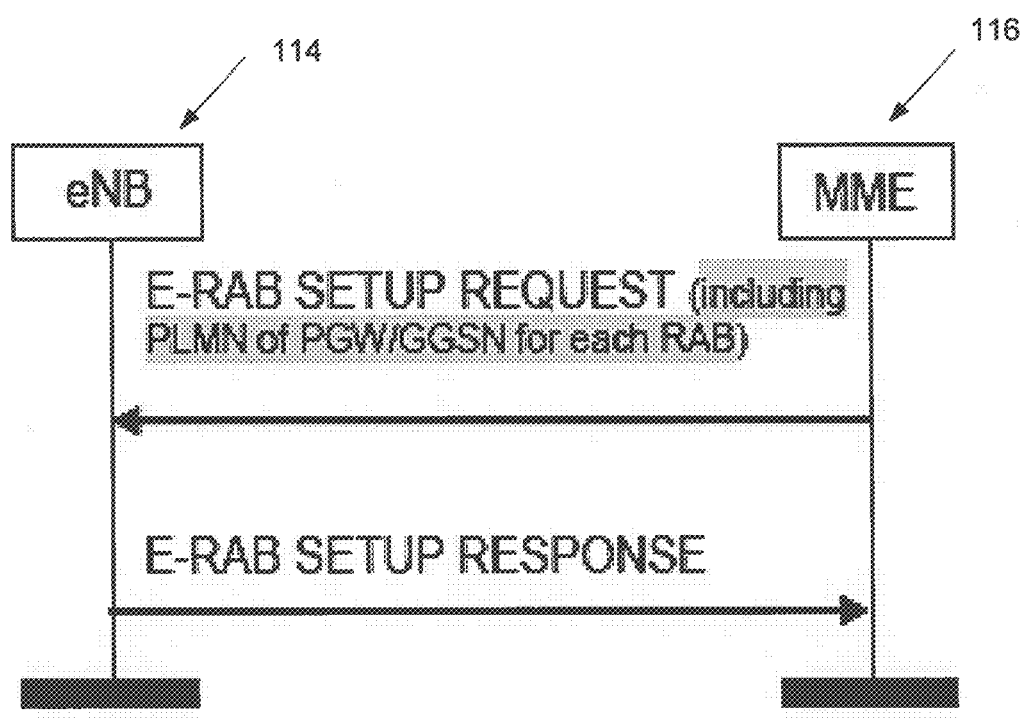

F-TEID is an existing information element as specified in section 8.22 TS 29.274 as follows:

8.22 Fully Qualified TEID (F-TEID)
Fully Qualified Tunnel Endpoint Identifier (F-TEID) is coded as depicted in FIG. 8.22-1.

| FIG. 8.22-1: Fully Qualified Tunnel Endpoint Identifier (F-TEID) | | | | | | | | |
|---|---|---|---|---|---|---|---|---|
| | Bits | | | | | | | |
| Octets | 8 | 7 | 6 | 5 | 4 | 3 | 2 | 1 |
| 1 | Type = 87 (decimal) | | | | | | | |
| 2 to 3 | Length = n | | | | | | | |
| 4 | Spare | | | | Instance | | | |
| 5 | V4 | V6 | Interface Type | | | | | |
| 6 to 9 | TEID/GRE Key | | | | | | | |
| m to (m + 3) | IPv4 address | | | | | | | |
| p to (p + 15) | IPv6 address | | | | | | | |
| k to (n + 4) | These octet(s) is/are present only if explicitly specified | | | | | | | |

The Octets 6-9 (a.k.a., the TEID/GRE Key field) is encoded for TEID, where PLMN ID of the PGW 120 may be embedded according to an operator's configuration. That is, the PLMN ID of the PGW 120 may be encoded in the TEID/GRE Key field of the F-TEID information element.

Figure 3:
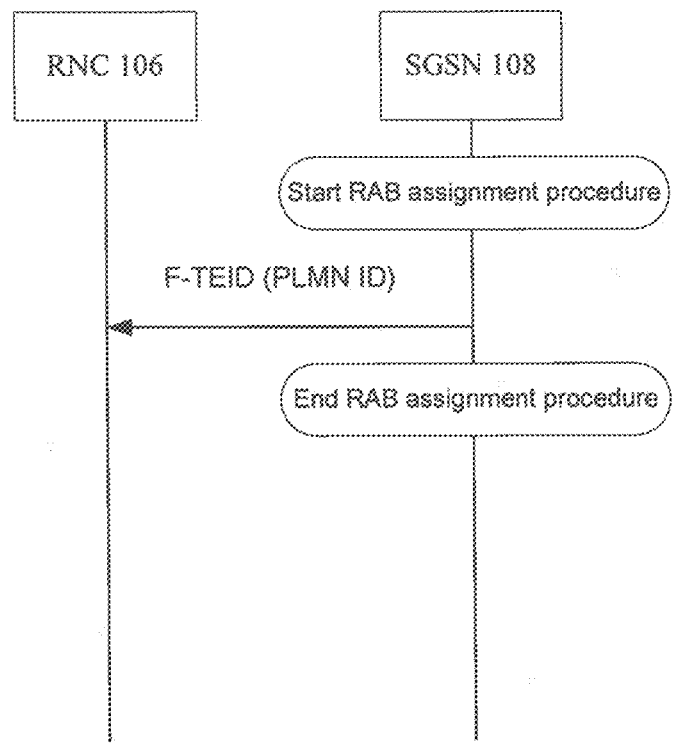

For 3G when direct tunnel is not used, the SGSN 108 will provide SGSN F-TEID to the RNC 106 during RAB assignment procedure (this is illustrated in FIG. 3). Accordingly, the SGSN 108 can embed PLMN information of the PGW 120 for a given PDN connection into SGSN F-TEID, as described above.

Figure 4:
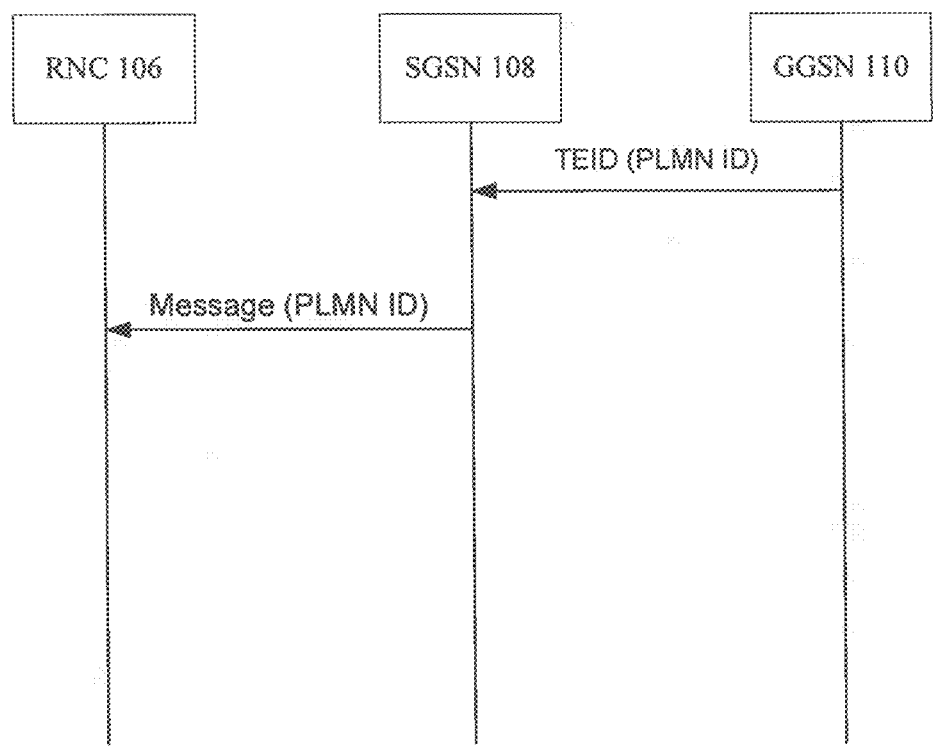

For legacy Gn/Gp SGSN interworking with a GGSN in another PLMN when direct tunnel is used, the GGSN may embed PLMN ID of the GGSN for a given PDP into GGSN TEID on the user plane, which will be forwarded by the Gn/Gp SGSN to the RNC 106 as described in FIG. 4. Stage 2 changes to current specifications may be needed in order to describe that the TEID forwarded to RNC 106 or eNB contains information about the HPLMN ID or VPLMN ID corresponding to the PGW 120 where the RAB is established.

When indirect data forwarding is used during handover/ SRNS relocation procedure and when the SGW 118 selected as data forwarding is NOT the anchor SGW, the forwarding SGW has no knowledge of PLMN information of the PGW 120, thus those packets received via indirect tunneling may not associated with a PLMN information, hence they may not be correctly handled. This requires when setting up the indirect tunnel, the SGSN 108/MME 116 shall either not use non-anchor SGW, or shall let the data forwarding SGW know about PLMN information of PGW 120. This implies a protocol change—to add PLMN information of the PGW 120 in the GTP message "Create Indirect Data Forwarding Tunnel Request message", so when data forwarding SGW 118 allocates SGW F-TEID for data forwarding, it can embed such PLMN information of the PGW into the SGW F-TEID.

II. Provide PLMN ID During Bearer Establishment

It is also possible to provide the PLMN ID of the PGW 120 serving the UE 128 to the RNC 106 or eNB 114 during RAB assignment procedure and SRNS relocation procedure (for 3G) or Initial UE context setup/E-RAB establishment procedure and handover procedure (for 4G), by the SGSN 108 or MME 116.

Figure 5:
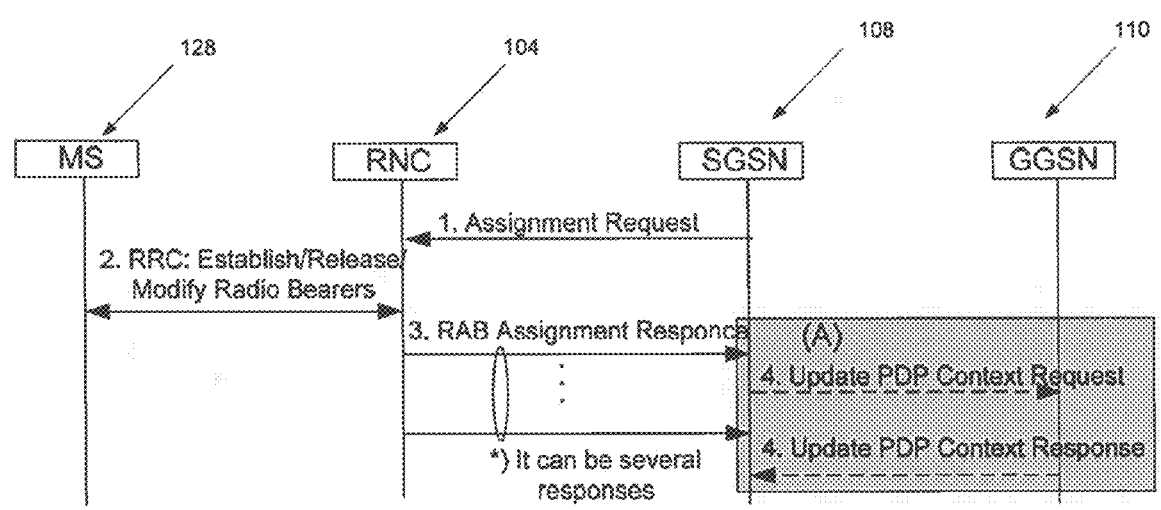

The procedure for RAB assignment procedure for 3G is described in the section 12.7.4.1 of TS 23.060 RAB Assignment Procedure Using Gn/Gp and in the section 8.2.2 of TS 25.413 and illustrated in FIG. 5.

Figure 6:
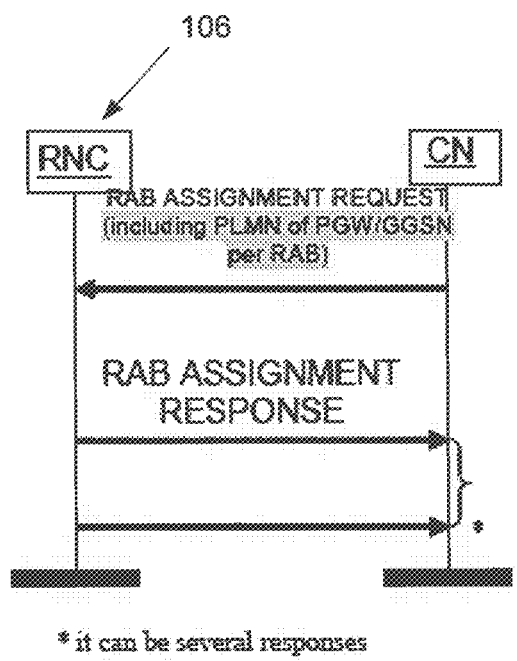

In the RAB Assignment Request message, a new IE, preferably called "PLMN of PGW/GGSN" is included, and associated with each RAB. Addition of the new PLMN of PGW/GGSN IE in the RAB Assignment Request message is shown in Table 1. FIG. 6 illustrate a core network node (CN) transmitting a message of type RAB assignment request to an RNC 106. The RAB assignment request message includes the PLMN ID of the PGW serving the UE that the RAB identified in the message is for.

Figure 7:
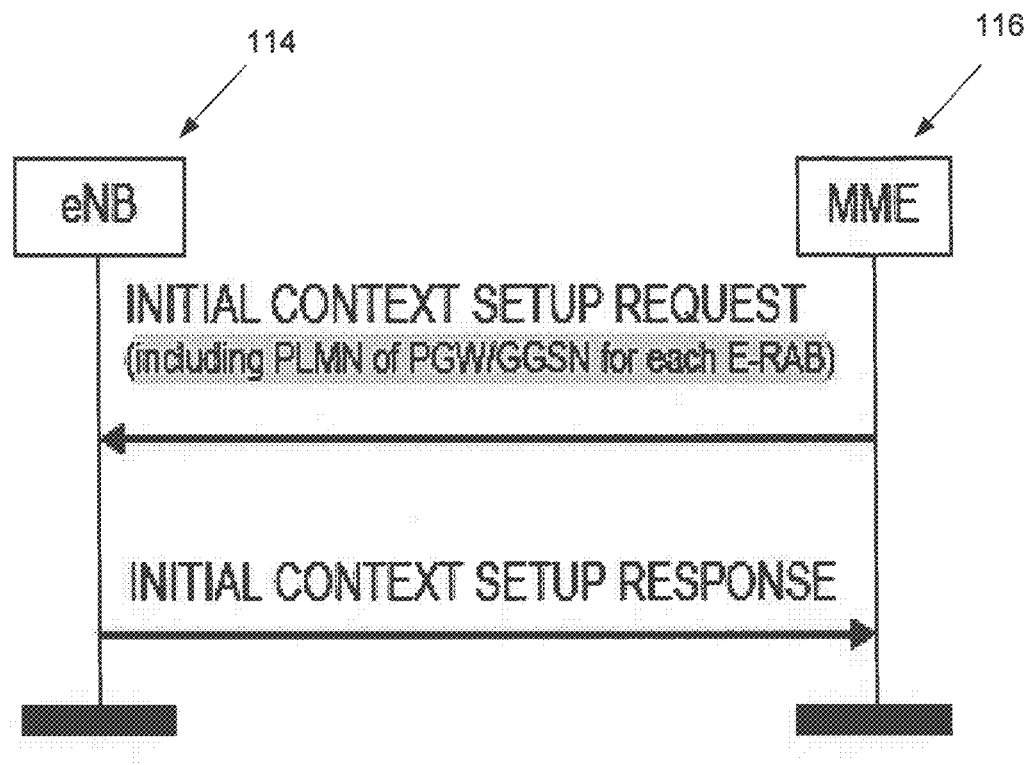

An MME may provide to an eNB 114 the PLMN ID using a message of type Initial Context Setup Request, as shown in FIG. 7. Addition of the new PLMN of PGW/GGSN IE in the INITIAL COTEXT SETUP message is shown in Table 2.

Figure 9A:
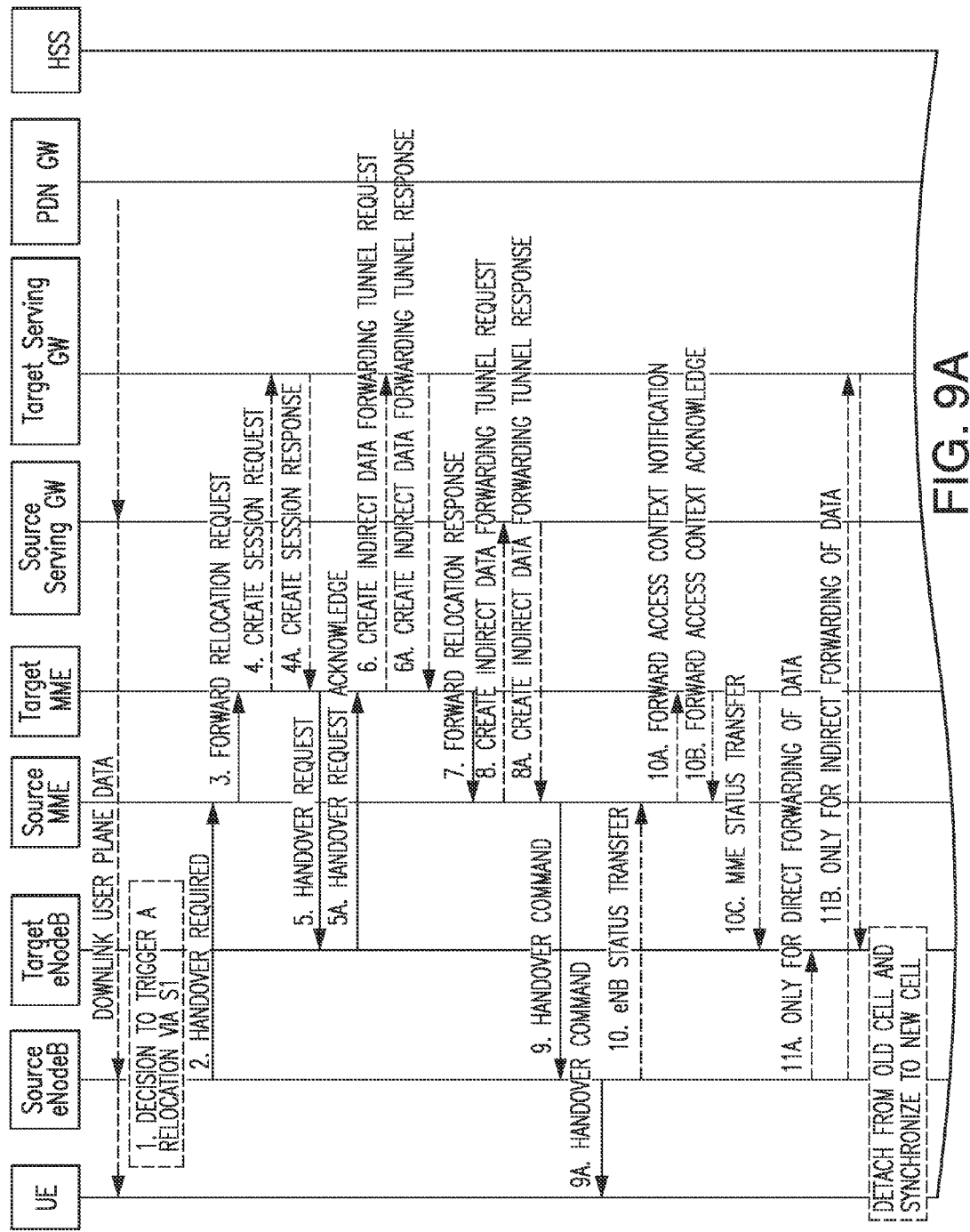
Figure 9B:
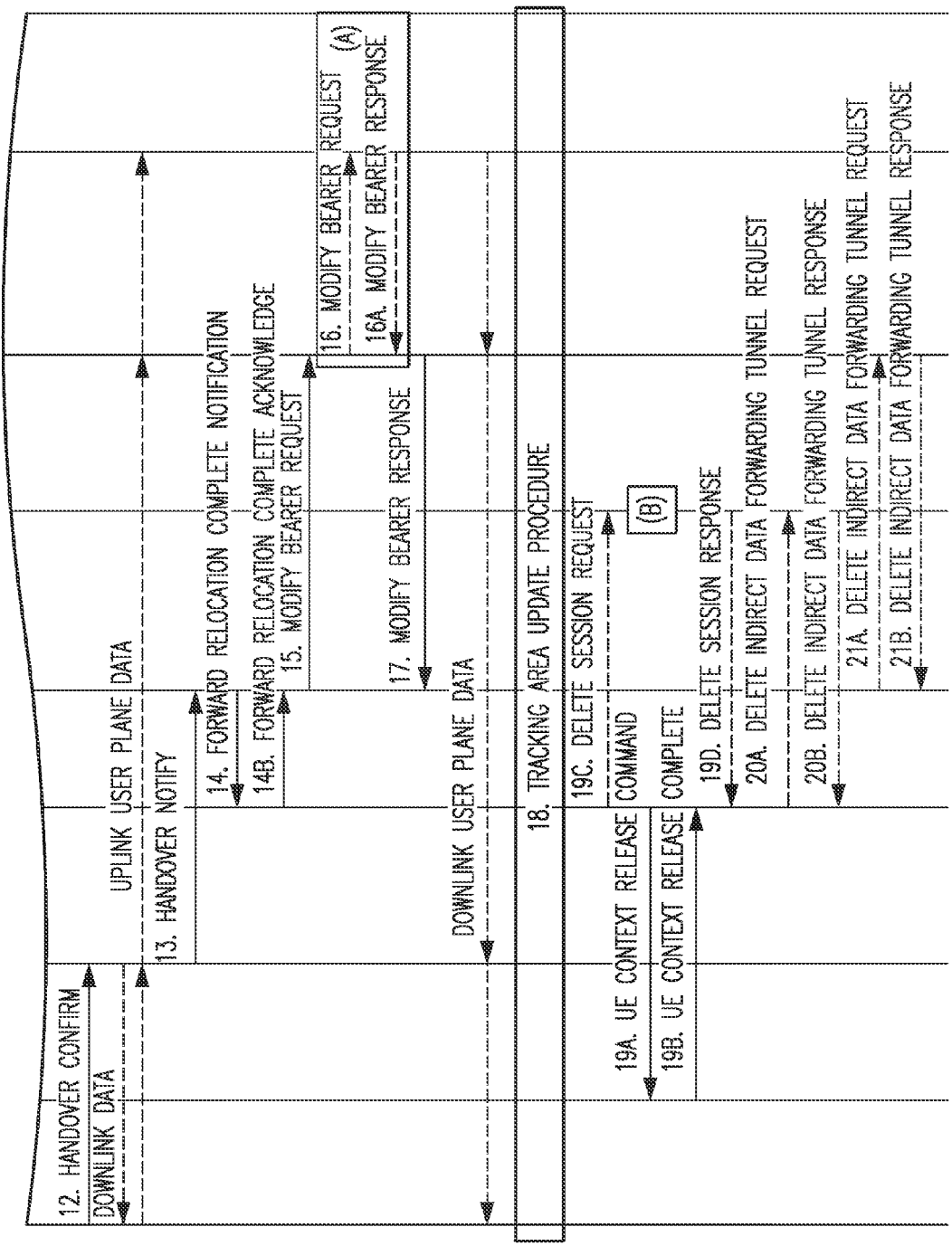

An MME 116 may provide to an eNB 114 the PLMN ID using a message of type E-RAB Setup Request, as shown in FIG. 8. Addition of the new PLMN of PGW 120/GGSN 110 IE in the E-RAB SETUP REQUEST message is shown in Table 3. Once the PLMN of PGW 120/GGSN 110 has been transferred to the serving RAN according to the embodiment above, there is also the need to transfer such information during handover procedures across different base stations. This should be done both for UTRAN 102 and E-UTRAN 112 and both for network based handovers (i.e. S1 or RANAP handovers) or direct interface handovers such as X2 or Iur handovers. The S1 handover procedure for E-UTRAN 112 is described in TS23.401 section 5.5.1.2.2 and as is shown in FIGS. 9A and 9B. In alternate embodiments, an equivalent procedure exists for UTRAN RANAP based handovers.

In addition, when indirect tunneling is applicable, the target RAN should apply the received PLMN of the PGW 120 via Handover Request and Relocation Request also to that associated data forwarding tunnel.

The new PLMN of PGW IE shall be added to the HANDOVER REQUEST message to communicate to the target RAN the PLMN ID of the PGW associated to the handed over RAB. An example of how such new IE could be included is shown in table 4. An equivalent modification can be applied to UTRAN 102 by adding the "PLMN of PGW/GGSN" IE by using a RANAP: RELOCATION REQUEST message.

In case of mobility for E-UTRAN 112 and UTRAN 102 not involving the CN (i.e., X2 or Iur based mobility), the new information may be added to the respective mobility messages. For E-UTRAN 112 the X2 handover procedure is described in TS36.300 section 10.1.2.1.1. An equivalent procedure, SRNS relocation, exists for UTRAN over the Iur interface.

For UTRAN 102, the new PLMN of PGW IE shall be added to the HANDOVER REQUIRED message to communicate to the target RAN the PLMN ID of the PGW 120 associated with the handed over RAB. An example of how such new IE could be included is shown in the Table 5: Example of inclusion of new "PLMN of PGW" IE in the X2: HANDOVER REQUIRED message (see TS36.423).

In the case of UTRAN 102, the new PLMN of PGW/GGSN IE shall be added in the RNSAP: Enhanced Relocation Request message and in particular in the RANAP Enhanced Relocation Information Required IE defined in TS25.413. An example of how this could be achieved is shown in Table 6: Example of inclusion of new "PLMN of PGW/GGSN" IE in the RANAP Enhanced Relocation Information IE included in the RNSAP: Enhanced Relocation Request message (see TS25.423).

The new information concerning the PLMN ID of the PGW 120/GGSN 110 associated to the RAB handed over may be sent for each RAB.

The information added to the messages and procedures above shall not be limited to the PLMN ID of the PGW 120/GGSN 110 to which the RAB is associated. Such information could include any indication that allows the RAN to understand the actions to be taken upon reception of SIRIG-like marking. For example, the information added could consist of an index pointing at a particular SIRIG policy, which allows the RAN to understand the RRM policy so as to apply packets with specific SIRIG marking.

III. Example Network Node

Figure 10:
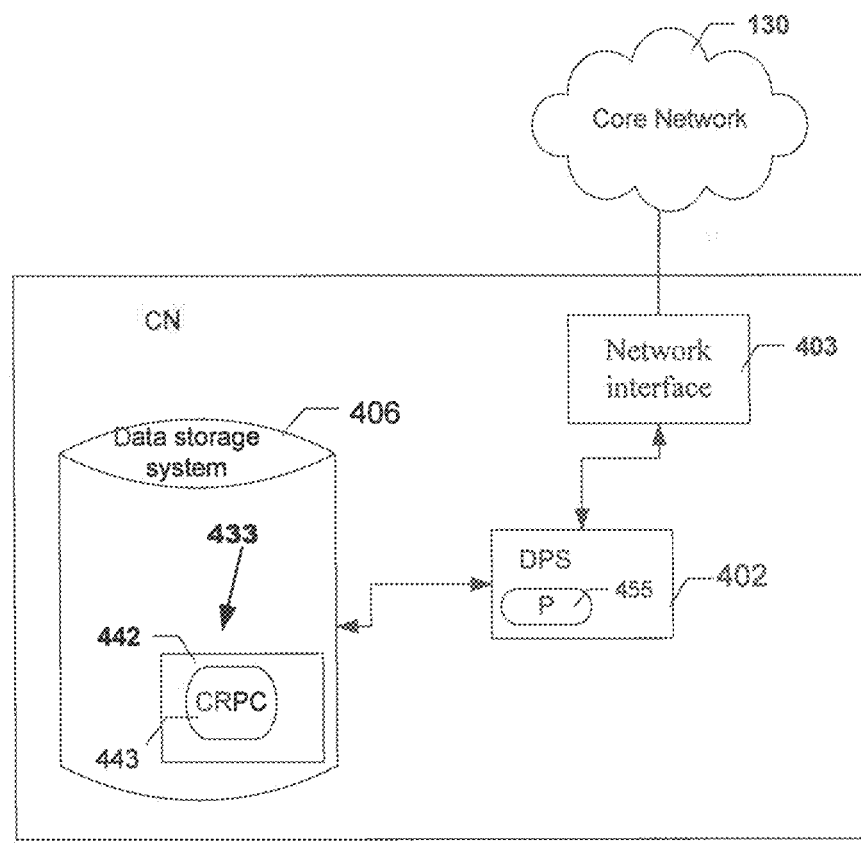
FIG. 10 illustrates an example block diagram of an example core network node.

FIG. 10 illustrates a block diagram of an example core network node. As shown in FIG. 10, the core network node includes: a data processing system (DPS) 402, which may include one or more processors (P) 455 (e.g., microprocessors) and/or one or more circuits, such as an application specific integrated circuit (ASIC), Field-programmable gate arrays (FPGAs), etc.; a network interface 403 for connecting the network node to a network 130; a data storage system 406, which may include one or more computer-readable data storage mediums, such as non-transitory memory unit (e.g., hard drive, flash memory, optical disk, etc.) and/or volatile storage apparatuses (e.g., dynamic random access memory (DRAM)).

In embodiments where data processing system 402 includes a processor 455 (e.g., a microprocessor), a computer program product 433 may be provided, which computer program product includes: computer readable program code 443 (e.g., instructions), which implements a computer program, stored on a computer readable medium 442 of data storage system 406, such as, but not limited, to magnetic media (e.g., a hard disk), optical media (e.g., a DVD), memory devices (e.g., random access memory), etc. In some embodiments, computer readable program code 443 is configured such that, when executed by data processing system 402, code 443 causes the data processing system 402 to perform steps described herein.

In some embodiments, network node is configured to perform steps described above without the need for code 443. For example, data processing system 402 may consist merely of specialized hardware, such as one or more application-specific integrated circuits (ASICs). Hence, the features of the present invention described above may be implemented in hardware and/or software. For example, in some embodiments, the functional components of network node described above may be implemented by data processing system 402 executing program code 443, by data processing system 402 operating independent of any computer program code 443, or by any suitable combination of hardware and/or software.

While various aspects and embodiments of the present disclosure have been described above, it should be understood that they have been presented by way of example only, and not limitation. Thus, the breadth and scope of the present disclosure should not be limited by any of the above-described exemplary embodiments. Moreover, any combination of the elements described in this disclosure in all possible variations thereof is encompassed by the disclosure unless otherwise indicated herein or otherwise clearly contradicted by context.

Additionally, while the processes described herein and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

TABLES

Table 1 is an example table of inclusion of new "PLMN of PGW/GGSN" IE in a RAB ASSIGNMENT REQUEST message (see TS25.413)). Table 2 is an example table of inclusion of new "PLMN of PGW/GGSN" IE in an INITIAL CONTEXT SETUP message (see TS36.413). Table 3 is an example table of inclusion of new "PLMN of PGW" IE in a E-RAB SETUP REQUEST message (see TS36.413)). Table 4 is an example table of inclusion of new "PLMN of PGW" IE in the HANDOVER REQUEST message (see TS36.413). Table 5 is an example table of inclusion of new "PLMN of PGW" IE in the X2: HANDOVER REQUIRED message (see TS36.423). Table 6 is an example table of inclusion of new "PLMN of PGW/GGSN" IE in the RANAP Enhanced Relocation Information IE included in the RNSAP: Enhanced Relocation Request message (see TS25.423). Table 7 is an example table of RAB Assignment Request message with new IE for PLMN ID. Table 8 is an example table indicating an Initial Context Setup Request message with new IE for PLMN ID). Table 9 is an example table indicating an E-RAB SETUP REQUEST with new IE for PLMN ID.

TABLE 1

| IE/Group Name | Presence | Range | IE type and reference | Semantics description | Criticality | Assigned Criticality |
|---|---|---|---|---|---|---|
| Message Type | M | | 9.2.1.1 | | YES | reject |
| RABs To Be Setup Or Modified List | O | | | | YES | ignore |
| >RABs To Be Setup Or Modified Item IEs | | 1 to <maxnoofRABs> | | | | |
| >>First Setup Or Modify Item | M | | | Grouping reason: same criticality. | EACH | reject |
| >>>RAB ID | M | | 9.2.1.2 | The same RAB ID must only be present in one group. | — | |
| >>>NAS Synchronisation Indicator | O | | 9.2.3.18 | | — | |
| >>>PLMN of PGW/GGSN | O | | 9.2.3.33 | The PLMN ID of the PGW/GGSN involved in the RAB assignment | | |
| >>>RAB Parameters | O | | 9.2.1.3 | Includes all necessary parameters for RABs (both for MSC and SGSN) including QoS. | — | |
| >>>User Plane Information | O | | | | — | |
| >>>>User Plane Mode | M | | 9.2.1.18 | | — | |
| >>>>UP Mode Versions | M | | 9.2.1.19 | | — | |
| >>>Transport Layer Information | O | | | | — | |
| >>>>Transport Layer Address | M | | 9.2.2.1 | | — | |
| >>>>Iu Transport Association | M | | 9.2.2.2 | | — | |
| >>>Service Handover | O | | 9.2.1.41 | | — | |
| >>>E-UTRAN Service Handover | O | | 9.2.1.90 | | YES | Ignore |
| >>>Correlation ID | O | | 9.2.2.5 | | — | |
| >>Second Setup Or Modify Item | M | | | Grouping reason: same criticality. | EACH | Ignore |

TABLE 1-continued

| IE/Group Name | Presence | Range | IE type and reference | Semantics description | Criticality | Assigned Criticality |
|---|---|---|---|---|---|---|
| >>>PDP Type Information | O | | 9.2.1.40 | | — | |
| >>>Data Volume Reporting Indication | O | | 9.2.1.17 | | — | |
| >>>DL GTP-PDU Sequence Number | O | | 9.2.2.3 | | — | |
| >>>UL GTP-PDU Sequence Number | O | | 9.2.2.4 | | — | |
| >>>DL N-PDU Sequence Number | O | | 9.2.1.33 | | — | |
| >>>UL N-PDU Sequence Number | O | | 9.2.1.34 | | — | |
| >>>Alternative RAB Parameter Values | O | | 9.2.1.43 | | YES | Ignore |
| >>>GERAN BSC Container | O | | 9.2.1.58 | | YES | Ignore |
| >>>PDP Type Information extension | O | | 9.2.1.40a | The PDP Type Information extension IE can only be included if PDP Type Information IE is not present. | YES | Ignore |
| >>>Offload RAB parameters | O | | 9.2.1.94 | Applicable only for SIPTO at Iu-PS. | YES | Ignore |
| RABs To Be Released List | O | | | | YES | Ignore |
| >RABs To Be Released Item IEs | | 1 to <maxnoofRABs> | | | EACH | Ignore |
| >>RAB ID | M | | 9.2.1.2 | The same RAB ID must only be present in one group. | — | |
| >>Cause | M | | 9.2.1.4 | | — | |
| UE Aggregate Maximum Bit Rate | O | | 9.2.1.91 | | YES | Ignore |
| MSISDN | O | | 9.2.1.95 | Applicable only for SIPTO at Iu-PS. | YES | Ignore |

TABLE 2

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | reject |
| eNB UE S1AP ID | M | | 9.2.3.4 | | YES | reject |
| UE Aggregate Maximum Bit Rate | M | | 9.2.1.20 | | YES | reject |
| E-RAB to Be Setup List | | 1 | | | YES | reject |
| >E-RAB to Be Setup Item IEs | | 1 . . . <maxnoofE-RABs> | | | EACH | reject |
| >>E-RAB ID | M | | 9.2.1.2 | | — | |
| >>E-RAB Level QoS Parameters | M | | 9.2.1.15 | Includes necessary QoS parameters. | — | |
| >>Transport Layer Address | M | | 9.2.2.1 | | — | |
| >>GTP-TEID | M | | 9.2.2.2 | | — | |
| >>NAS-PDU | O | | 9.2.3.5 | | — | |
| >>Correlation ID | O | | 9.2.1.80 | | YES | ignore |
| >>PLMN of PGW | O | | 9.2.3.8 | The PLMN ID of the PGW/GGSN | | |

TABLE 2-continued

| IE/Group Name | Presence | Range | IE type and reference | Semantics description | Criticality | Assigned Criticality |
|---|---|---|---|---|---|---|
| | | | | involved in the RAB assignment | | |
| UE Security Capabilities | M | | 9.2.1.40 | | YES | reject |
| Security Key | M | | 9.2.1.41 | The KeNB is provided after the key-generation in the MME, see TS 33.401 [15]. | YES | reject |
| Trace Activation | O | | 9.2.1.4 | | YES | ignore |
| Handover Restriction List | O | | 9.2.1.22 | | YES | ignore |
| UE Radio Capability | O | | 9.2.1.27 | | YES | ignore |
| Subscriber Profile ID for RAT/Frequency priority | O | | 9.2.1.39 | | YES | ignore |
| CS Fallback Indicator | O | | 9.2.3.21 | | YES | reject |
| SRVCC Operation Possible | O | | 9.2.1.58 | | YES | ignore |
| CSG Membership Status | O | | 9.2.1.73 | | YES | ignore |
| Registered LAI | O | | 9.2.3.1 | | YES | ignore |
| GUMMEI | O | | 9.2.3.9 | This IE indicates the MME serving the UE. | YES | ignore |
| MME UE S1AP ID 2 | O | | 9.2.3.3 | This IE indicates the MME UE S1AP ID assigned by the MME. | YES | ignore |
| Management Based MDT Allowed | O | | 9.2.1.83 | | YES | ignore |
| Management Based MDT PLMN List | O | | MDT PLMN List 9.2.1.89 | | YES | ignore |

TABLE 3

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | reject |
| eNB UE S1AP ID | M | | 9.2.3.4 | | YES | reject |
| UE Aggregate Maximum Bit Rate | O | | 9.2.1.20 | | YES | reject |
| E-RAB to be Setup List | | 1 | | | YES | reject |
| >E-RAB to Be Setup Item IEs | | 1 ... <maxnoofE-RABs> | | | EACH | reject |
| >>E-RAB ID | M | | 9.2.1.2 | | — | |
| >>E-RAB Level QoS Parameters | M | | 9.2.1.15 | Includes necessary QoS parameters. | — | |
| >>Transport Layer Address | M | | 9.2.2.1 | | — | |
| >>GTP-TEID | M | | 9.2.2.2 | EPC TEID. | — | |
| >>NAS-PDU | M | | 9.2.3.5 | | — | |
| >>Correlation ID | O | | 9.2.1.80 | | YES | ignore |
| >>PLMN of PGW | O | | 9.2.3.8 | The PLMN ID of the PGW/GGSN involved in the RAB assignment | | |

TABLE 4

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | reject |
| Handover Type | M | | 9.2.1.13 | | YES | reject |
| Cause | M | | 9.2.1.3 | | YES | ignore |
| UE Aggregate Maximum Bit Rate | M | | 9.2.1.20 | | YES | reject |
| E-RABs To Be Setup List | | 1 | | | YES | reject |
| >E-RABs To Be Setup Item IEs | | 1 ... <maxnoofE-RABs> | | | EACH | reject |
| >>E-RAB ID | M | | 9.2.1.2 | | — | |
| >>Transport Layer Address | M | | 9.2.2.1 | | — | |
| >>GTP-TEID | M | | 9.2.2.2 | To deliver UL PDUs. | — | |
| >>E-RAB Level QoS Parameters | M | | 9.2.1.15 | Includes necessary QoS parameters. | — | |
| >>Data Forwarding Not Possible | O | | 9.2.1.76 | | YES | ignore |
| >>PLMN of PGW | O | | 9.2.3.8 | The PLMN ID of the PGW/GGSN involved in the RAB assignment | | |
| Source to Target Transparent Container | M | | 9.2.1.56 | | YES | reject |
| UE Security Capabilities | M | | 9.2.1.40 | | YES | reject |
| Handover Restriction List | O | | 9.2.1.22 | | YES | ignore |
| Trace Activation | O | | 9.2.1.4 | | YES | ignore |
| Request Type | O | | 9.2.1.34 | | YES | ignore |
| SRVCC Operation Possible | O | | 9.2.1.58 | | YES | ignore |
| Security Context | M | | 9.2.1.26 | | YES | reject |
| NAS Security Parameters to E-UTRAN | C-iffromUTRANGERAN | | 9.2.3.31 | The eNB shall use this IE as specified in TS 33.401 [15]. | YES | reject |
| CSG Id | O | | 9.2.1.62 | | YES | reject |
| CSG Membership Status | O | | 9.2.1.73 | | YES | ignore |
| GUMMEI | O | | 9.2.3.9 | This IE indicates the MME serving the UE. | YES | ignore |
| MME UE S1AP ID 2 | O | | 9.2.3.3 | This IE indicates the MME UE S1AP ID assigned by the MME. | YES | ignore |
| Management Based MDT Allowed | O | | 9.2.1.83 | | YES | ignore |
| Management Based MDT PLMN List | O | | MDT PLMN List 9.2.1.89 | | YES | ignore |

TABLE 5

| IE/Group Name | Presence | Range | IE type and reference | Semantics description | Criticality | Assigned Criticality |
|---|---|---|---|---|---|---|
| Message Type | M | | 9.2.13 | | YES | reject |
| Old eNB UE X2AP ID | M | | eNB UE X2AP ID 9.2.24 | Allocated at the source eNB | YES | reject |
| Cause | M | | 9.2.6 | | YES | ignore |
| Target Cell ID | M | | ECGI 9.2.14 | | YES | reject |
| GUMMEI | M | | 9.2.16 | | YES | reject |
| UE Context Information | | 1 | | | YES | reject |
| >MME UE S1AP ID | M | | INTEGER (0 ... $2^{32} - 1$) | MME UE S1AP ID allocated at the MME | — | — |
| >UE Security Capabilities | M | | 9.2.29 | | — | — |
| >AS Security Information | M | | 9.2.30 | | — | — |

TABLE 5-continued

| IE/Group Name | Presence | Range | IE type and reference | Semantics description | Criticality | Assigned Criticality |
|---|---|---|---|---|---|---|
| >UE Aggregate Maximum Bit Rate | M | | 9.2.12 | | — | — |
| >Subscriber Profile ID for RAT/Frequency priority | O | | 9.2.25 | | — | — |
| >E-RABs To Be Setup List | | 1 | | | — | — |
| >>E-RABs To Be Setup Item | | 1 . . . <maxnoof Bearers> | | | EACH | ignore |
| >>>E-RAB ID | M | | 9.2.23 | | — | — |
| >>>E-RAB Level QoS Parameters | M | | 9.2.9 | Includes necessary QoS parameters | — | — |
| >>>DL Forwarding | O | | 9.2.5 | | — | — |
| >>>UL GTP Tunnel Endpoint | M | | GTP Tunnel Endpoint 9.2.1 | SGW endpoint of the S1 transport bearer. For delivery of UL PDUs. | — | — |
| >>PLMN of PGW | O | | 9.2.3.8 | The PLMN ID of the PGW/GGSN involved in the RAB assignment | | |
| >RRC Context | M | | OCTET STRING | Includes the RRC Handover Preparation Information message as defined in subclause 10.2.2 of TS 36.331 [9] | — | — |
| >Handover Restriction List | O | | 9.2.3 | | — | — |
| >Location Reporting Information | O | | 9.2.21 | Includes the necessary parameters for location reporting | — | — |
| >Management Based MDT Allowed | O | | 9.2.59 | | YES | ignore |
| >Management Based MDT PLMN List | O | | MDT PLMN List 9.2.64 | | YES | ignore |
| UE History Information | M | | 9.2.38 | Same definition as in TS 36.413 [4] | YES | ignore |
| Trace Activation | O | | 9.2.2 | | YES | ignore |
| SRVCC Operation Possible | O | | 9.2.33 | | YES | ignore |
| CSG Membership Status | O | | 9.2.52 | | YES | reject |
| Mobility Information | O | | BIT STRING (SIZE (32)) | Information related to the handover; the source eNB provides it in order to enable later analysis of the conditions that led to a wrong HO. | YES | ignore |

TABLE 6

| IE/Group Name | Presence | Range | IE type and reference | Semantics description | Criticality | Assigned Criticality |
|---|---|---|---|---|---|---|
| Message Type | M | | 9.2.1.1 | | YES | ignore |
| Source RNC To Target RNC Transparent Container | M | | 9.2.1.28 | | YES | reject |

TABLE 6-continued

| IE/Group Name | Presence | Range | IE type and reference | Semantics description | Criticality | Assigned Criticality |
|---|---|---|---|---|---|---|
| Old Iu Signalling Connection Identifier CS domain | O | | 9.2.1.38 | | YES | ignore |
| Global CN-ID CS domain | O | | 9.2.1.46 | | YES | reject |
| Old Iu Signalling Connection Identifier PS domain | O | | 9.2.1.38 | | YES | ignore |
| Global CN-ID PS domain | O | | 9.2.1.46 | | YES | reject |
| RABs To Be Setup List | O | | | | YES | reject |
| >RABs To Be Setup Item IEs | | 1 to <maxnoofRABs> | | | EACH | reject |
| >>CN Domain Indicator | M | | 9.2.1.5 | | — | |
| >>RAB ID | M | | 9.2.1.2 | | — | |
| >>RAB Parameters | M | | 9.2.1.3 | | — | |
| >>Data Volume Reporting Indication | C-ifPS | | 9.2.1.17 | | — | |
| >>PDP Type Information | C-ifPS | | 9.2.1.40 | | — | |
| >>>PLMN of PGW/GGSN | O | | 9.2.3.33 | The PLMN ID of the PGW/GGSN involved in the RAB assignment | | |
| >>User Plane Information | M | | | | | |
| >>>User Plane Mode | M | | 9.2.1.18 | | — | |
| >>>UP Mode Versions | M | | 9.2.1.19 | | — | |
| >>Data Forwarding TNL Information | O | | | | | |
| >>>Transport Layer Address | M | | 9.2.2.1 | | | |
| >>>Transport Association | M | | Iu Transport Association 9.2.2.2 | Related to TLA above. | | |
| >>Source Side Iu UL TNL Information | O | | | | | |
| >>>Transport Layer Address | M | | 9.2.2.1 | | — | |
| >>>Iu Transport Association | M | | 9.2.2.2 | | — | |
| >>Service Handover | O | | 9.2.1.41 | | — | |
| >>Alternative RAB Parameter Values | O | | 9.2.1.43 | | — | |
| >>E-UTRAN Service Handover | O | | 9.2.1.90 | | YES | ignore |
| >>PDP Type Information extension | O | | 9.2.1.40a | The PDP Type Information extension IE can only be included if PDP Type Information IE is present. | YES | Ignore |

TABLE 6-continued

| IE/Group Name | Presence | Range | IE type and reference | Semantics description | Criticality | Assigned Criticality |
|---|---|---|---|---|---|---|
| SNA Access Information | O | | 9.2.3.24 | | YES | ignore |
| UESBI-Iu | O | | 9.2.1.59 | | YES | ignore |
| Selected PLMN Identity | O | | 9.2.3.33 | | YES | ignore |
| CN MBMS Linking Information | O | | | | YES | ignore |
| >Joined MBMS Bearer Service IEs | | 1 to <maxnoofMulticastServicesPerUE> | | | EACH | ignore |
| >>TMGI | M | | 9.2.3.37 | | — | |
| >>PTP RAB ID | M | | 9.2.1.75 | | — | |
| Integrity Protection Information | O | | 9.2.1.11 | Integrity Protection Information includes key and permitted algorithms. | YES | ignore |
| Encryption Information | O | | 9.2.1.12 | Integrity Protection Information includes key and permitted algorithms. | YES | ignore |
| UE Aggregate Maximum Bit Rate | O | | 9.2.1.91 | | YES | ignore |
| RAB Parameters List | O | | 9.2.1.102 | Applicable only to RNSAP relocation. | YES | reject |
| CSG ID | O | | 9.2.1.85 | Applicable only to Enhanced Relocation from RNC towards a hybrid cell and RNSAP relocation. | YES | reject |
| CSG Membership Status | O | | 9.2.1.92 | Applicable only to Enhanced Relocation from RNC towards a hybrid cell and RNSAP relocation. | YES | reject |
| Anchor PLMN Identity | O | | 9.2.3.33 | Indicates the PS core network operator in case of SRVCC (see TS 23.251 [39]). | YES | ignore |

TABLE 7

| IE/Group Name | Presence | Range | IE type and reference | Semantics description | Criticality | Assigned Criticality |
|---|---|---|---|---|---|---|
| Message Type | M | | 9.2.1.1 | | YES | reject |
| RABs To Be Setup Or Modified List | O | | | | YES | ignore |
| >RABs To Be Setup Or Modified Item IEs | | 1 to <maxnoofRABs> | | | | |

TABLE 7-continued

| IE/Group Name | Presence | Range | IE type and reference | Semantics description | Criticality | Assigned Criticality |
|---|---|---|---|---|---|---|
| >>First Setup Or Modify Item | M | | | Grouping reason: same criticality | EACH | reject |
| >>>RAB ID | M | | 9.2.1.2 | The same RAB ID must only be present in one group. | — | |
| >>>NAS Synchronisation Indicator | O | | 9.2.3.18 | | — | |
| >>>RAB Parameters | O | | 9.2.1.3 | Includes all necessary parameters for RABs (both for MSC and SGSN) including QoS. | — | |
| >>>User Plane Information | O | | | | — | |
| >>>>User Plane Mode | M | | 9.2.1.18 | | — | |
| >>>>UP Mode Versions | M | | 9.2.1.19 | | — | |
| >>>Transport Layer Information | O | | | | — | |
| >>>>Transport Layer Address | M | | 9.2.2.1 | | — | |
| >>>>Iu Transport Association | M | | 9.2.2.2 | | — | |
| >>>Service Handover | O | | 9.2.1.41 | | — | |
| >>>E-UTRAN Service Handover | O | | 9.2.1.90 | | YES | ignore |
| >>>Correlation ID | O | | 9.2.2.5 | | — | |
| >>>PLMN of PGW/GGSN | O | | | | YES | ignore |
| >>Second Setup Or Modify Item | M | | | Grouping reason: same criticality | EACH | ignore |
| >>>PDP Type Information | O | | 9.2.1.40 | | — | |
| >>>Data Volume Reporting Indication | O | | 9.2.1.17 | | — | |
| >>>DL GTP-PDU Sequence Number | O | | 9.2.2.3 | | — | |
| >>>UL GTP-PDU Sequence Number | O | | 9.2.2.4 | | — | |
| >>>DL N-PDU Sequence Number | O | | 9.2.1.33 | | — | |
| >>>UL N-PDU Sequence Number | O | | 9.2.1.34 | | — | |
| >>>Alternative RAB Parameter Values | O | | 9.2.1.43 | | YES | ignore |
| >>>GERAN BSC Container | O | | 9.2.1.58 | | YES | ignore |
| >>>PDP Type Information extension | O | | 9.2.1.40a | The PDP Type Information extension IE can only be included if PDP Type Information IE is not present. | YES | ignore |

TABLE 7-continued

| IE/Group Name | Presence | Range | IE type and reference | Semantics description | Criticality | Assigned Criticality |
|---|---|---|---|---|---|---|
| >>>Offload RAB parameters | O | | 9.2.1.94 | Applicable only for SIPTO at Iu-PS | YES | ignore |
| RABs To Be Released List | O | | | | YES | ignore |
| >RABs To Be Released Item IEs | | 1 to <maxnoofRABs> | | | EACH | ignore |
| >>RAB ID | M | | 9.2.1.2 | The same RAB ID must only be present in one group. | — | |
| >>Cause | M | | 9.2.1.4 | | — | |
| UE Aggregate Maximum Bit Rate | O | | 9.2.1.91 | | YES | ignore |
| MSISDN | O | | 9.2.1.95 | Applicable only for SIPTO at Iu-PS | YES | ignore |

TABLE 8

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | reject |
| eNB UE S1AP ID | M | | 9.2.3.4 | | YES | reject |
| UE Aggregate Maximum Bit Rate | M | | 9.2.1.20 | | YES | reject |
| E-RAB to Be Setup List | | 1 | | | YES | reject |
| >E-RAB to Be Setup Item IEs | | 1 to <maxnoofE-RABs> | | | EACH | reject |
| >>E-RAB ID | M | | 9.2.1.2 | | — | |
| >>E-RAB Level QoS Parameters | M | | 9.2.1.15 | Includes necessary QoS parameters | — | |
| >>Transport Layer Address | M | | 9.2.2.1 | | — | |
| >>GTP-TEID | M | | 9.2.2.2 | | — | |
| >>NAS-PDU | O | | 9.2.3.5 | | — | |
| >>Correlation ID | O | | 9.2.2.80 | | YES | ignore |
| >>PLMN of PGW | O | | | | YES | ignore |
| UE Security Capabilities | M | | 9.2.1.40 | | YES | reject |
| Security Key | M | | 9.2.1.41 | The KeNB is provided after the key-generation in the MME, see TS 33.401 [15] | YES | reject |
| Trace Activation | O | | 9.2.1.4 | | YES | ignore |
| Handover Restriction List | O | | 9.2.1.22 | | YES | ignore |
| UE Radio Capability | O | | 9.2.1.27 | | YES | ignore |
| Subscriber Profile ID for RAT/Frequency priority | O | | 9.2.1.39 | | YES | ignore |
| CS Fallback Indicator | O | | 9.2.3.21 | | YES | reject |
| SRVCC Operation Possible | O | | 9.2.1.58 | | YES | ignore |
| CSG Membership Status | O | | 9.2.1.73 | | YES | ignore |
| Registered LAI | O | | 9.2.3.1 | | YES | ignore |
| GUMMEI ID | O | | 9.2.3.9 | This IE indicates the MME serving the UE | YES | ignore |
| MME UE S1AP ID 2 | O | | 9.2.3.3 | This IE indicates the MME UE S1AP ID assigned by the MME | YES | ignore |
| Management Based MDT Allowed | O | | 9.2.1.83 | | YES | ignore |

TABLE 9

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | reject |
| eNB UE S1AP ID | M | | 9.2.3.4 | | YES | reject |
| UE Aggregate Maximum Bit Rate | O | | 9.2.1.20 | | YES | reject |
| E-RAB to be Setup List | | 1 | | | YES | reject |
| >E-RAB To Be Setup Item IEs | | 1 to <maxnoof E-RABs> | | | EACH | reject |
| >>E-RAB ID | M | | 9.2.1.2 | | — | |
| >>E-RAB Level QoS Parameters | M | | 9.2.1.15 | Includes necessary QoS parameters | — | |
| >>Transport Layer Address | M | | 9.2.2.1 | | — | |
| >>GTP-TEID | M | | 9.2.2.2 | EPC TEID | — | |
| >>NAS-PDU | M | | 9.2.3.5 | | — | |
| >>Correlation ID | O | | 9.2.2.80 | | YES | ignore |
| >>PLMN of PGW | O | | | | YES | ignore |

What is claimed is:

1. A method in a communication system comprising a first core network node (CN), a second CN, a base station apparatus serving a user equipment (UE), and a packet data network gateway (PGW) located in a Public Land Mobile Network (PLMN) and associated with the UE, the method being performed by the first CN and comprising:
the first CN receiving a tunneling endpoint identifier (TEID) information element from a second CN, the TEID information element comprises a plurality of fields, wherein one of said plurality of fields of the TEID information element includes a PLMN ID identifying the PLMN in which the PGW is located; and
the first CN forwarding to the base station apparatus the received PLMN identifier that identifies the PLMN in which the PGW is located,
wherein the second CN is a Gateway General Packet Radio Service Support Node (GGSN) when the first CN is a Serving General Packet Radio Service Support Node (SGSN) and a Serving Gateway (SGW) when the first CN is an Mobility Management Entity (MME),
wherein the TEID information element is a Fully Qualified TEID (F-TEID) information element (IE), and
wherein the step of receiving the TEID information element comprises receiving the F-TEID in a message comprising at least nine sequential octets and the sixth through ninth octets of said at least nine sequential octets are used to encode the PLMN ID.

2. The method of claim 1, wherein the base station apparatus is an evolved NodeB (eNB).

3. The method of embodiment 1, wherein:
the base station apparatus comprises a radio network controller (RNC) and a base station, and
forwarding the received PLMN ID to the base station apparatus comprises forwarding the PLMN ID to the RNC.

4. The method of claim 1, wherein said one of said plurality of fields of the F-TEID information element includes a TEID/GRE Key field and said PLMN ID is encoded in said TEID/GRE Key field.

5. A method in a communication system comprising a first core network node (CN), a base station apparatus serving a user equipment (UE), and a packet data network gateway (PGW) located in a Public Land Mobile Network (PLMN) and associated with the UE, the method being performed by the first CN and comprising:

the first CN receiving a tunneling endpoint identifier (TEID) information element from a second CN, the TEID information element comprises a plurality of fields, wherein one of said plurality of fields of the TEID information element includes a PLMN identifier (ID) identifying the PLMN in which the PGW is located; and
the first CN transmitting a message to the base station apparatus, wherein the message comprises: i) an information element containing the PLMN ID that identifies the PLMN in which the PGW is located and ii) a radio access bearer (RAB) identifier information element comprising data identifying a RAB,
wherein the first CN is one of a Serving General Packet Radio Service Support Node (SGSN) and a Mobility Management Entity (MME),
wherein the second CN is a Gateway General Packet Radio Service Support Node (GGSN) when the first CN is the SGSN and a Serving Gateway (SGW) when the first CN is the MME,
wherein the TEID information element is a Fully Qualified TEID (F-TEID) information element (IE), and
wherein the step of receiving the TEID IE comprises receiving the F-TEID in a message comprising at least nine sequential octets and the sixth through ninth octets of said at least nine sequential octets are used to encode the PLMN ID.

6. The method of claim 5, wherein the message further comprises a message type information element indicating that the message is a RAB Assignment Request message.

7. The method of claim 5, wherein the message further comprises a message type information element indicating that the message is an Initial Context Setup Request message.

8. The method of claim 5, wherein the message further comprises a message type information element indicating that the message is a EUTRAN RAB (E-RAB) Setup Request message.

9. The method of claim 5, wherein the message further comprises a message type information element indicating that the message is a Handover Request message.

10. The method of claim 5, wherein the RAB is an E-RAB.

11. The method of claim 5, further comprising:
the base station apparatus transmitting to a source MME a handover message comprising the PLMN ID of the PGW;
the source MME transmitting to a target MME a relocation request message comprising the PLMN ID received by the source MME in the handover message; and
the target MME transmitting to a target base station apparatus a message comprising the PLMN ID the target MME received from the source MME via the relocation message.

12. A method in a communication system comprising a first core network node (CN), a second CN, and a packet data network gateway (PGW) located in a Public Land Mobile Network (PLMN) and associated with user equipment (UE), the method being performed by the first CN and comprising:
the first CN encoding in a TEID/GRE Key field of a F-TEID information element (IE) a PLMN identifier (ID) that identifies the PLMN in which the PGW is located; and
the first CN transmitting the F-TEID information element containing the PLMN ID to the second CN,
wherein the first CN is one of a Gateway General Packet Radio Service Support Node (GGSN) and a Serving Gateway (SGW),
wherein the second CN is a Serving General Packet Radio Service Node (SGSN) when the first CN is the GGSN and a Mobility Management Entity (MME) when the first CN is the SGW, and
wherein transmitting the F-TEID IE comprising at least nine sequential octets and the sixth through ninth octets of said at least nine sequential octets are used to encode the PLMN ID.

13. The method of claim 12, further comprises the second CN transmitting the received PLMN ID to a base station apparatus serving the UE.

14. The method of claim 12, wherein
the step of transmitting the F-TEID IE to the second CN comprises transmitting a create session response, including the F-TEID information element, to the second CN; and
the method further comprises: prior to the first CN encoding the PLMN ID in the TEID/GRE key field, the first CN receiving a create session request message from the second CN, wherein the create session request identifies the PGW.

15. The method of claim 1, further comprising:
prior to the first CN receiving the TEID information element (IE) from the second CN, the first CN transmits a Create Session Request message to the second CN and, as a result, receives from the second CN a Create Session Response message, wherein
the TEID IE containing the PLMN ID is included in the Create Session Response message, and
the step of forwarding the received PLMN identifier to the base station comprises transmitting to the base station a context setup request message comprising the PLMN ID.

* * * * *